Feb. 28, 1956  E. M. HICKS  2,736,402
VEHICLE SAFETY EXIT WINDOW STRUCTURE
Filed April 13, 1950
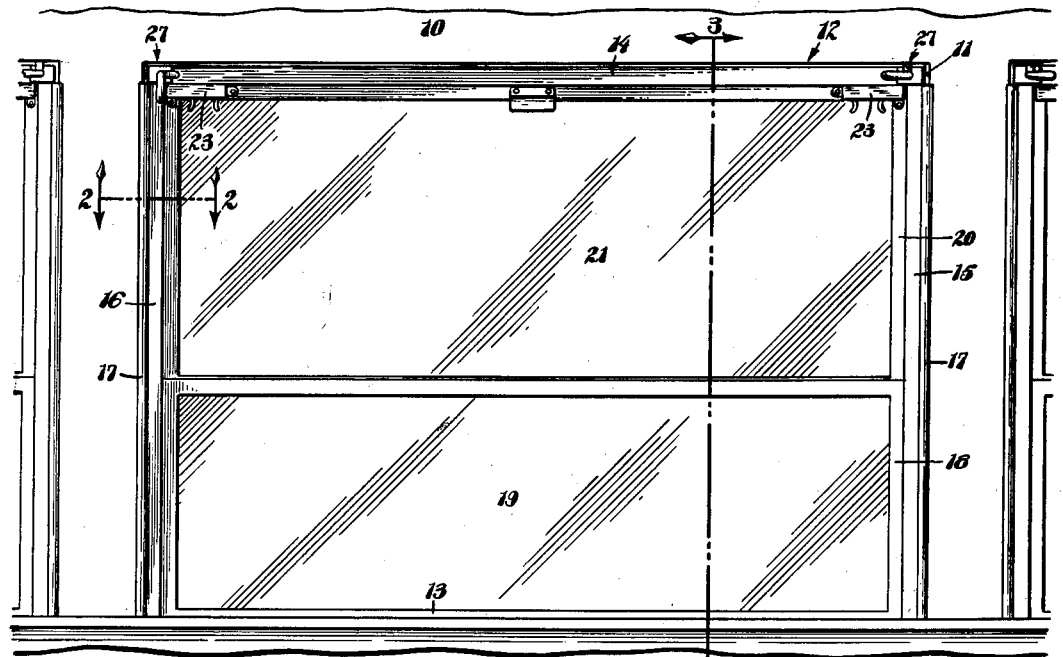
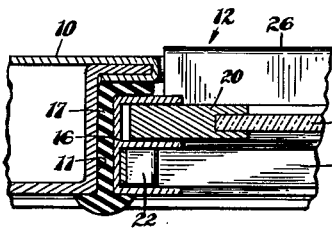
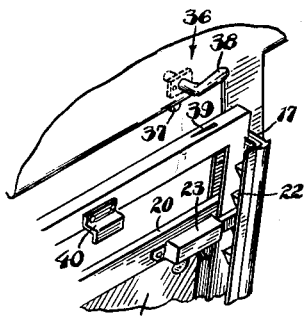
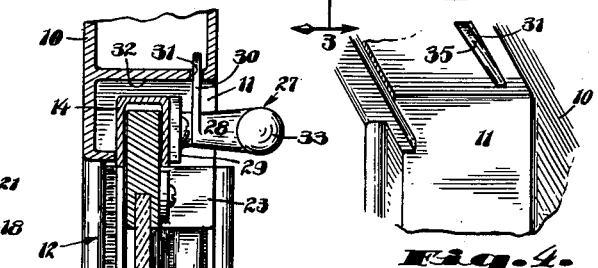
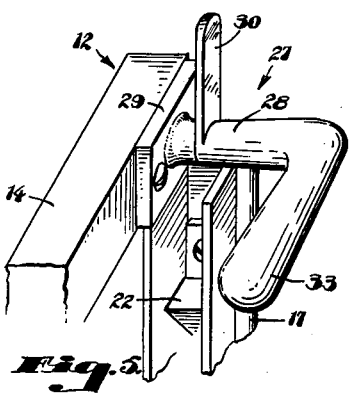
INVENTOR.
EARL M. HICKS,
BY:
Harold B. Hood.
ATTORNEY.

United States Patent Office 2,736,402
Patented Feb. 28, 1956

2,736,402

VEHICLE SAFETY EXIT WINDOW STRUCTURE

Earl M. Hicks, Lebanon, Ind.

Application April 13, 1950, Serial No. 155,673

7 Claims. (Cl. 189—64)

The present invention relates to a safety exit window assembly, primarily intended for use in school bus bodies and the like, but having characteristics which make it highly adaptable to use in any sort of vehicle, and further being capable of installation wherever a window assembly may be desired. The primary oobject of the invention is to provide a window assembly, capable of being installed as a unit to fit and fill an opening in any enclosure, so constructed as to be capable of being readily secured in place in such filling relation with the opening, and yet being readily removable therefrom to provide for convenient egress from the enclosure in an emergency. It is a further object of the invention to provide such a unit in which the frame is filled by a plurality of sashes, at least one of which is movable relative to the frame between open and closed positions.

A further object of the invention is to provide an assembly of the character above outlined, which shall be entirely self-contained, regardless of the adjustment of the movable sash or sashes. Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a more or less diagrammatic, fragmental illustration of a portion of a vehicle body, or the like, showing my window assembly installed therein;

Fig. 2 is a fragmental horizontal section, drawn to an enlarged scale, and taken substantially on the line 2, 2 of Fig. 1;

Fig. 3 is a broken vertical section, likewise drawn to an enlarged scale and taken substantially on the line 3, 3 of Fig. 1;

Fig. 4 is a fragmental perspective view, showing the details of a structural feature of my invention;

Fig. 5 is a fragmental perspective view of a corner of my window frame, showing one form of movable latch element; and Fig. 6 is a reduced, fragmental perspective view of a modified embodiment of my invention.

The constructional details of school bus bodies are rigorously hedged about by numerous, and non-uniform, local legislative regulations, most of which are intended to promote safety and comfort for the passengers to be carried in such vehicles, and most of which are effectively conducive to that end. In most jurisdictions, it is required that such vehicle bodies be provided with numerous transparent windows, that those windows shall include movable sashes, and that at least some of those windows shall be capable of manipulation, in one manner or another, to provide for a sufficient open area to permit passenger egress therethrough, in case of an emergency.

It is undesirable to arrange a window sash to move downwardly, beyond the confines of the window frame, into the walls of the vehicle body, for the reason that such a construction inevitably permits some moisture seepage into the chamber provided in the body walls for such reception of the sash. Therefore, optimum structure is that in which the frame is filled by two sashes, only one of which is movable between open and closed positions, the path of movement of the movable sash being entirely within the window frame.

The available vertical space is not sufficient to provide for sash movement, under these conditions, great enough to produce such an opening as will permit passenger egress.

According to the present invention, therefore, I propose to install, in each vehicle body opening, or in certain selected ones of such openings, a window assembly comprising a closed, substantially rectangular frame carrying two sashes, one of which is movable between open and closed positions, the entire frame being proportioned and designed to be received in and to fill the opening in the vehicle body, and being readily removably secured in such filling location in that opening, by means of readily manipulable latch means adjacent one edge of the frame and means arranged along another edge of the frame and adapted to cooperate with the vehicle body to hold the frame in its filling location in that opening.

What I consider to be an optimum embodiment of my invention is illustrated in Figs. 1 to 5 of the drawings forming a part of this application, wherein I have shown a fragment of a bus body, indicated generally by the reference numeral 10, provided with a plurality of openings such as 11. My window assembly, indicated generally by the reference numeral 12, is shown in filling association with such an opening.

The window assembly comprises a frame which, as shown, includes a bottom rail 13, a top rail 14, and side rails 15 and 16, suitably associated to provide substantial rigidity. Preferably, headed rubber strips 17 will be secured to the outer surfaces of the rails 15 and 16, in the manner most clearly illustrated in Fig. 2, to provide a weatherproof, compressible juncture between the sides of the frame and the opening 11. A sash 18, having a hyaline filler 19, is suitably mounted in the frame, said sash, in the present embodiment of my invention, being fixed in a suitable channel in the frame. A second sash 20, having a hyaline filler 21, is reciprocably mounted in a separate channel in the frame, a series of teeth 22 preferably being provided in the frame channel for cooperation with latches 23, 23, in accordance with conventional practice.

The rub rail, or any other suitable element of bus body construction, is provided with an upstanding flange 24 adjacent the lower boundary of the opening 11, and said flange preferably supports a U-shaped edging strip of rubber or the like 25. The lower rail 13 of my window frame is formed with a flange 26, offset outwardly from the plane of the frame and adapted to engage over the flange 24 and its strip 25, whereby the inner surface of the flange 26 and the outer surface of the strip 25 engage and cooperate, when the window assembly is located in the opening 11, to hold the lower edge of that assembly against inward movement relative to the opening.

Adjacent its opposite or upper edge, the window frame is provided with movable latch means. In the form of invention illustrated in Figs. 1 to 5, that latch means is indicated generally by the reference numeral 27 and comprises a rock shaft 28 suitably secured to the window frame, by means of an escutcheon plate 29 or the like, upon an axis perpendicular to the plane of the window frame. A finger 30 projects radially from the rock shaft 28 in a plane closely adjacent the inner surface of the frame; and said finger is movable, by oscillation of the rock shaft, into and out of engagement in a slot 31 formed in the upper boundary 32 of the opening 11, and elongated in a direction parallel to the length of the frame rail 14. A handle 33 likewise projects radially from the rock shaft 28, but is displaced substantially inwardly from the plane of the inner surface of the frame to provide space, between said handle and said frame, for the insertion of an operator's fingers. The parts are so arranged that, when the finger 30 is in its active position, engaged in the slot 31, the handle 33 will extend inwardly, away from the frame rail 15 and the corresponding boundary of the opening 11; and oscillation of the rock shaft to disengage the finger 30 from the slot 31 is effected by turning the handle 33 downwardly away from the portion 32 of the boundary of the opening 11. This arrangement, made possible by the angular separation of the elements 30 and 33 by approximately 90°, permits the use of a handle 33 whose radial length is greater than the distance from the axis of the rock shaft 28 to the adjacent vertical boundaries of the opening 11, thereby permitting the arrangement of the latch elements 27 directly in the corners of the window frame. Obviously, that location for the latch elements facilitates manipulation of the entire assembly. In case of accident, creating an emergency which would render the removal of my window frames necessary, there is always the possibility of such wrenching or straining of the vehicle body as might tend to jam the window assembly against removal; and the location of the latch assemblies, whose handles 33 will be used as pulling handles for removing the window assembly from its opening, will obviously permit the more effective exertion of force upon the frame, when located directly at those corners, than would be possible if they were located nearer to the vertical center of the frame.

In order that vibration may not tend to rotate the latch shafts toward inactive positions, the slot 31 is tapered as it approaches the adjacent vertical boundary of the opening 15, so that, as the finger 30 is turned to active position, it is jammed in the slot. Such tapering may effectively be produced by inclining one wall 35 of the slot, while arranging the other slot wall in a plane perpendicular to the axis of the rock shaft 28.

While the above-described arrangement is deemed optimum, some of the advantages of my invention would be attained by the modified structure illustrated in Fig. 6, in which the latch means, indicated generally by the reference numeral 36, comprises a rock shaft journalled in the vehicle body adjacent the opening 11 and carrying a finger 37 and a manipulating handle 38, the finger 37 being adapted to enter a slot 39, similar to the slot 31, formed in the upper rail of the window frame. When this form of latch means is used, a separate handle or handles 40 must be provided for facilitating the removal of the frame from the opening 11.

I claim as my invention:

1. A safety exit window assembly primarily intended for vehicle bodies and comprising, for use with a wall structure having an opening therein, a frame proportioned and designed to fit in and fill such opening, a pair of sashes carried in said frame, at least one of said sashes being movable relative to said frame and the other sash between open and closed positions, flange means arranged along one edge of said frame, offset in one direction from the plane of said movable sash and positioned to engage the outer surface of said wall structure when said frame is located in such opening to restrain said one frame edge against inward movement relative to such wall structure, and movable latch means shiftable between an inactive position and a position providing a positive connection between another edge of said frame and the boundary of such opening to hold said frame in such filling relation to such opening.

2. A safety exit window assembly primarily intended for vehicle bodies and comprising, for use with a wall structure having an opening therein, a frame proportioned and designed to fit in and fill such opening, a pair of sashes carried in said frame, at least one of said sashes being movable relative to said frame and the other sash between open and closed positions, said frame providing a surface, along one edge thereof, engaging with an external surface of such wall structure when said frame is located in such opening, to hold said frame edge against inward movement relative to such wall structure, and movable latch means carried by said frame and having a manually-manipulable portion positioned for ready accessibility near the inner surface of said wall structure, said latch means being shiftable between an inactive position and a position providing a positive connection between another edge of said frame and the boundary of such opening to hold said other frame edge against inward movement relative to such wall structure.

3. A safety exit window assembly primarily intended for vehicle bodies and comprising, for use with a wall structure having an opening therein, a frame proportioned and designed to fit in and fill such opening, filler means for said frame including a pair of sashes, at least one of said sashes being movable relative to said frame, said frame providing a surface, along one edge thereof, engaging with an outwardly-facing surface of such wall structure, when said frame is located in such opening, to hold said frame edge against inward movement relative to said wall structure, and movable latch means shiftable between an inactive position and a position providing a connection between another edge of said frame and the boundary of such opening to hold said other frame edge against inward movement relative to said wall structure, said latch means comprising a rock shaft journalled in said frame adjacent said other frame edge, a finger carried on said rock shaft closely adjacent the plane of the inner surface of said frame, and a handle carried on said rock shaft and spaced substantially inwardly from said plane, the boundary of such opening being provided with a socket enterable by said finger in one position of said rock shaft.

4. The device of claim 3 in which said finger and said handle are angularly displaced from each other by approximately 90°.

5. The device of claim 4 in which said rock shaft is located in a corner of said frame remote from said first-named frame edge, the radial length of said finger exceeding the distance from said rock shaft axis to one adjacent frame edge, and the radial length of said handle exceeding the distance from said rock shaft axis to the other adjacent frame edge.

6. A safety exit window assembly primarily intended for vehicle bodies and comprising, for use with a wall structure having an opening therein, a frame proportioned and designed to fit in and fill such opening, filler means for said frame including a pair of sashes, at least one of said sashes being movable relative to said frame, said frame providing a surface, along one edge thereof, engaging with an outwardly-facing surface of such wall structure, when said frame is located in such opening, to hold said frame edge against inward movement relative to said wall structure, and movable latch means shiftable between an inactive position and a position providing a connection between another edge of said frame and the boundary of such opening to hold said other frame edge against inward movement relative to said wall structure, said latch means comprising a rock shaft journalled in said frame adjacent said other frame edge, a finger carried on said rock shaft closely adjacent the plane of the inner surface of said frame, and a handle carried on said rock shaft and spaced substantially inwardly from said plane, the boundary of such opening being formed to provide an outwardly-facing surface lying in a plane traversing the axis of said rock shaft and inclined outwardly, said surface being engageable by said finger as said latch means is shifted from inactive to active position.

7. A safety exit window assembly primarily intended for vehicle bodies and comprising, for use with a wall structure having an opening therein, a frame proportioned and designed to fit in and fill such opening, filler means for said frame including a pair of sashes, at least one of said sashes being movable relative to said frame, said frame providing a surface, along one edge thereof, engaging with an outwardly-facing surface of such wall structure, when said frame is located in such opening, to hold said frame edge against inward movement relative to said wall structure, and movable latch means shiftable between an inactive position and a position providing a connection between another edge of said frame and the boundary of such opening to hold said other frame edge against inward movement relative to said wall structure, said latch means comprising a rock shaft journalled in such wall structure adjacent the boundary of said opening remote from said first-named frame edge, a finger carried on said rock shaft in a plane occupied by said frame when said frame is located in said opening, and a handle carried by said rock shaft in a plane inwardly spaced from the plane of said finger, said frame being provided, in that edge adjacent said latch means when said frame is so located, with a socket enterable by said finger.

References Cited in the file of this patent

UNITED STATES PATENTS

| | | |
|---|---|---|
| 304,933 | Hotz | Sept. 9, 1884 |
| 617,186 | Riley | Jan. 3, 1899 |
| 1,203,281 | Turner | Oct. 31, 1916 |
| 1,554,541 | Zeman | Sept. 22, 1925 |
| 1,592,488 | Gurisch | July 13, 1926 |
| 1,661,198 | Rundgren | Mar. 6, 1928 |
| 1,680,388 | McClean | Aug. 14, 1928 |
| 2,102,250 | Zeeb et al. | Dec. 14, 1937 |
| 2,412,787 | Verhagen | Dec. 17, 1946 |
| 2,639,790 | Reitzel | May 26, 1953 |

FOREIGN PATENTS

| | | |
|---|---|---|
| 159,352 | Great Britain | Mar. 3, 1921 |